US007318037B2

(12) United States Patent
Solari

(10) Patent No.: US 7,318,037 B2
(45) Date of Patent: Jan. 8, 2008

(54) METHOD, SYSTEM AND PROGRAM PRODUCT FOR CALCULATING RELATIONSHIP STRENGTHS BETWEEN USERS OF A COMPUTERIZED NETWORK

(75) Inventor: Jaime Solari, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 10/649,149

(22) Filed: Aug. 27, 2003

(65) Prior Publication Data

US 2005/0050158 A1 Mar. 3, 2005

(51) Int. Cl.
*G06Q 10/00* (2006.01)
*G06Q 30/00* (2006.01)

(52) U.S. Cl. ............................................... 705/1; 707/3

(58) Field of Classification Search ..................... 705/1
See application file for complete search history.

(56) References Cited

U.S. PATENT DOCUMENTS 5,956,717 A 9/1999 Kraay et al.
6,175,831 B1 1/2001 Weinreich et al.
6,202,068 B1 3/2001 Kraay et al.
6,269,369 B1 * 7/2001 Robertson .................... 707/10
6,338,065 B1 1/2002 Takahashi et al.
6,405,197 B2 6/2002 Gilmour
6,697,800 B1 * 2/2004 Jannink et al. ................ 707/5
7,177,880 B2 * 2/2007 Ruvolo et al. ........... 707/104.1
2001/0039547 A1 11/2001 Black et al.
2002/0059201 A1 5/2002 Work
2002/0065696 A1 5/2002 Hack et al.
2002/0087600 A1 7/2002 Newbold
2002/0116466 A1 8/2002 Trevithick et al.
2002/0124053 A1 9/2002 Adams et al.
2002/0147710 A1 10/2002 Hu
2002/0161838 A1 10/2002 Pickover et al.
2002/0169737 A1 11/2002 Armstrong et al.
2002/0178161 A1 11/2002 Brezin et al.
2004/0122803 A1 * 6/2004 Dom et al. .................... 707/3

FOREIGN PATENT DOCUMENTS

JP 2000066970 A 3/2000
WO WO 95/29451 * 11/1995
WO WO 01/86942 A2 11/2001

* cited by examiner

OTHER PUBLICATIONS

Tiwana, "Affinity to Infinity in Peer-to-Peer Knowledge Platforms", Communications of the ACM, May 2003, vol. 46, No. 5, pp. 77-80.*

*Primary Examiner*—John W. Hayes
*Assistant Examiner*—Eric Liou
(74) *Attorney, Agent, or Firm*—Steven Kurlowecz; Hoffman, Warnick & D'Alessandro LLC

(57) ABSTRACT

Under the present invention a set of values is first determined. Such values include: a relative total value that is based on a total quantity of electronic interactions between a first user and a second user of the computerized network; a relative exclusive value that is based on a total quantity of electronic interactions exclusively between the first user and the second user; a relative longevity value that is based on a length of time the first user and the second user have been electronically interacting; and a relative recency value that is based on a recency of electronic interactions between the first user and the second user. Once determined, the values are weighted to yield normalized values. To calculate the relationship strength, the normalized values are summed and compared to a predetermined standard.

20 Claims, 3 Drawing Sheets

DETERMINE A RELATIVE TOTAL VALUE BASED ON A TOTAL QUANTITY OF ELECTRONIC INTERACTIONS BETWEEN A FIRST USER AND A SECOND USER OF THE COMPUTERIZED NETWORK. S1

DETERMINE A RELATIVE EXCLUSIVE VALUE BASED ON A TOTAL QUANTITY OF ELECTRONIC INTERACTIONS EXCLUSIVELY BETWEEN THE FIRST USER AND THE SECOND USER. S2

DETERMINE A RELATIVE LONGEVITY VALUE BASED ON A LENGTH OF TIME THE FIRST USER AND THE SECOND USER HAVE BEEN ELECTRONICALLY INTERACTING. S3

DETERMINE A RELATIVE RECENCY VALUE BASE ON A RECENCY QUANTITY OF ELECTRONIC INTERACTIONS BETWEEN THE FIRST USER AND THE SECOND USER. S4

DETERMINE A RELATIVE EXCLUSIVE TOTAL, RELATIVE EXCLUSIVE VALUE, THE RELATIVE RECENCY VALUE AND THE RELATIVE LONGEVITY VALUE TO YIELD NORMALIZED VALUES. S5

CALCULATE A RELATIONSHIP STRENGTH BETWEEN THE FIRST USER AND THE SECOND USER BASED ON THE NORMALIZED VALUES. S6

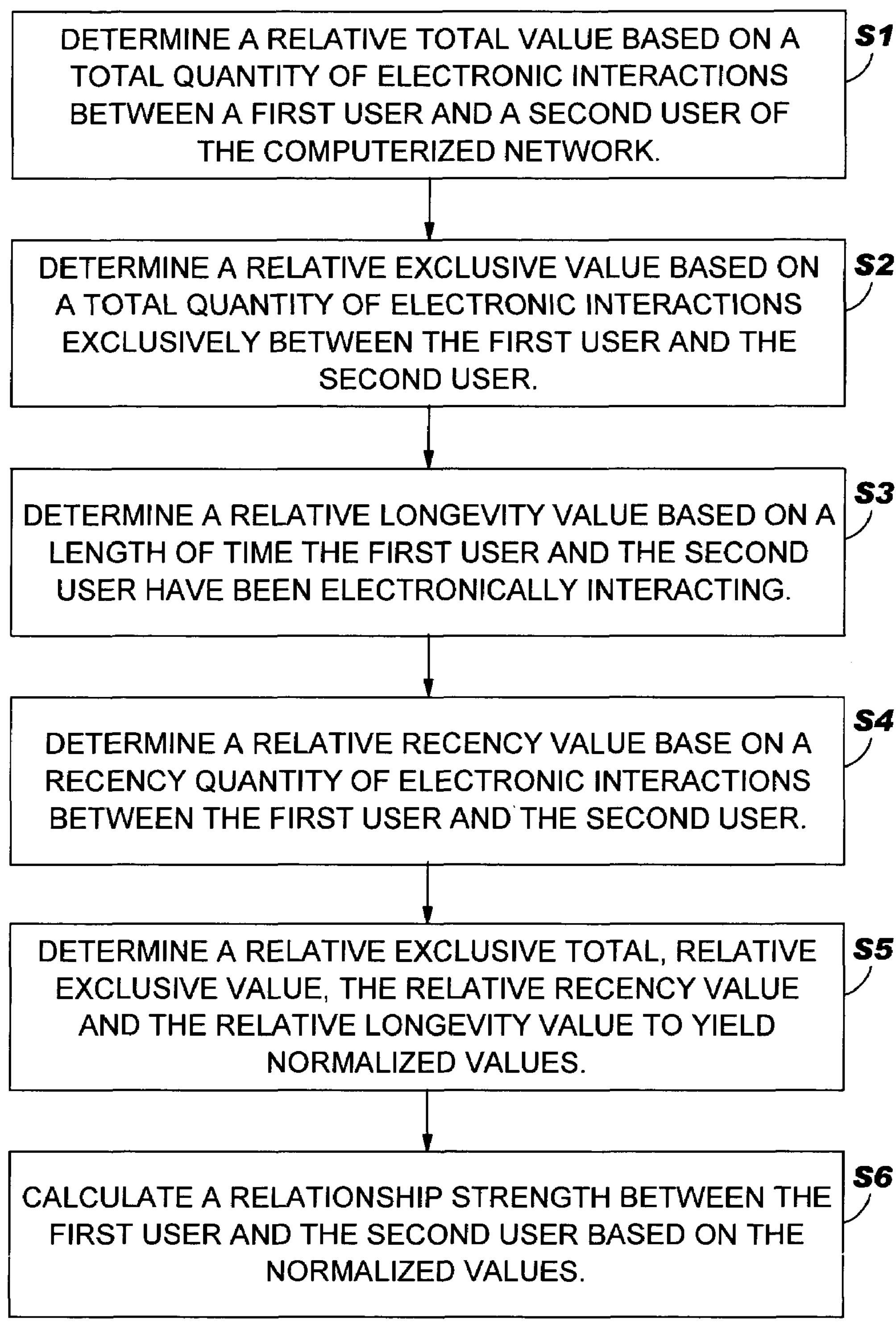
FIG. 3
DETERMINE A RELATIVE TOTAL VALUE BASED ON A TOTAL QUANTITY OF ELECTRONIC INTERACTIONS BETWEEN A FIRST USER AND A SECOND USER OF THE COMPUTERIZED NETWORK.
S1
DETERMINE A RELATIVE EXCLUSIVE VALUE BASED ON A TOTAL QUANTITY OF ELECTRONIC INTERACTIONS EXCLUSIVELY BETWEEN THE FIRST USER AND THE SECOND USER.
S2
DETERMINE A RELATIVE LONGEVITY VALUE BASED ON A LENGTH OF TIME THE FIRST USER AND THE SECOND USER HAVE BEEN ELECTRONICALLY INTERACTING.
S3
DETERMINE A RELATIVE RECENCY VALUE BASE ON A RECENCY QUANTITY OF ELECTRONIC INTERACTIONS BETWEEN THE FIRST USER AND THE SECOND USER.
S4
DETERMINE A RELATIVE EXCLUSIVE TOTAL, RELATIVE EXCLUSIVE VALUE, THE RELATIVE RECENCY VALUE AND THE RELATIVE LONGEVITY VALUE TO YIELD NORMALIZED VALUES.
S5
CALCULATE A RELATIONSHIP STRENGTH BETWEEN THE FIRST USER AND THE SECOND USER BASED ON THE NORMALIZED VALUES.
S6

METHOD, SYSTEM AND PROGRAM PRODUCT FOR CALCULATING RELATIONSHIP STRENGTHS BETWEEN USERS OF A COMPUTERIZED NETWORK

CROSS-REFERENCE TO RELATION APPLICATIONS

This application is related in some aspects to commonly owned U.S. application Ser. No. 10/323,568, filed Dec. 19, 2002 and entitled DETECT AND QUALIFY RELATIONSHIPS BETWEEN PEOPLE AND FIND THE BEST PATH THROUGH THE RESULTING SOCIAL NETWORK, herein incorporated by reference.

BACKGROUND OF THE INVENTION

1. Field of the Invention

The present invention generally relates to a method, system and program product for calculating relationship strengths between users of a computerized network. Specifically, the present invention calculates relationship strengths between the users based on the electronic interactions therebetween.

2. Related Art

Computer networks are becoming a powerful tool in business. For example, today, many businesses implement private networks such as a Local Area Network (LAN), a Wide Area Network (WAN), a Virtual Private Network (VPN), etc. in an effort to streamline business processes and connect employees with each other. Such networks are especially useful in large organizations where employees are located in different geographic regions. Further, such networks can provide a central way for employees to communicate with each other, to access resources (e.g., documents), etc. In optimizing a network, it could be advantageous to recognize patterns in employees' interactions. That is, it could be advantageous to know the various relationship strengths between employees. Knowledge of relationship strengths is typically useful for expertise location, referral in knowledge management, electronic mail filtering, categorization in messaging, resource organization from data mining, etc. For example, employee "A" might require expertise in a particular area. Upon searching a company database, employee "A" might realize that employee "B" in another location has the needed expertise. It would be advantageous for employee "A" to be able to determine if he/she has a relationship in common with employee "B" who could make an introduction.

Unfortunately, calculating a relationship strength between two individuals is not an easy task. In the above-incorporated patent application, several factors relating to relationship strength detection were discussed. For example, the quantity of times an employee e-mailed another could be an indication of their relationship strength. Further, the number of times an employee appeared in another employee's calendar was discussed as being an indicator of relationship strength. In any event, the amount of data required to make such determinations often makes implementing such systems overly burdensome. Moreover, the accuracy of the results could not be guaranteed, especially in special cases.

In view of the foregoing, there exists a need for a method, system and program product for calculating relationship strengths between users of a computerized network. Specifically, a need exists for a system that can calculate relationship strengths with an high level of accuracy, and without requiring a large volume of data to be collected.

SUMMARY OF THE INVENTION

In general, the present invention provides a method, system and program product for calculating relationship strengths between users of a computerized network. Specifically, under the present invention a set of values is first determined. Such values include: a relative total value that is based on a total quantity of electronic interactions between a first user and a second user of the computerized network; a relative exclusive value that is based on a total quantity of electronic interactions exclusively between the first user and the second user; a relative longevity value that is based on a length of time the first user and the second user have been electronically interacting; and a relative recency value that is based on a recency of electronic interactions between the first user and the second user. Once determined, these values are weighted to yield normalized values. To calculate the relationship strength, the normalized values are summed and compared to a predetermined standard.

A first aspect of the present invention provides a method for calculating relationships strengths between users of a computerized network, comprising: determining a relative total value based on a total quantity of electronic interactions between a first user and a second user of the computerized network; determining a relative exclusive value based on a total quantity of electronic interactions exclusively between the first user and the second user; determining a relative longevity value based on the length of time the first user and the second user have been electronically interacting; determining a relative recency value based the recency of electronic interactions between the first user and the second user; weighting the relative total value, the relative exclusive value, the relative recency value and the relative longevity value to yield normalized values; and calculating a relationship strength between the first user and the second user based on the normalized values.

A second aspect of the present invention provides a system for detecting relationships strengths between users of a computerized network, comprising: a value calculation system for determining: a relative total value based on a total quantity of electronic interactions between a first user and a second user of the computerized network, a relative exclusive value based on a total quantity of electronic interactions exclusively between the first user and the second user, a relative longevity value based on a length of time the first user and the second user have been electronically interacting, and a relative recency value based a recency of electronic interactions between the first user and the second user; and a strength calculation system for weighting the relative total value, the relative exclusive value, the relative recency value and the relative longevity value to yield normalized values, and for calculating a relationship strength between the first user and the second user based on the normalized values.

A third aspect of the present invention provides a program product stored on a recordable medium for detecting relationships strengths between users of a computerized network, comprising: program code for determining: a relative total value based on a total quantity of electronic interactions between a first user and a second user of the computerized network, a relative exclusive value based on a total quantity of electronic interactions exclusively between the first user and the second user, a relative longevity value based on a length of time the first user and the second user have been electronically interacting, and a relative recency value based a recency of electronic interactions between the first user and the second user; and program code for weighting the relative total value, the relative exclusive value, the relative recency value and the relative longevity value to yield normalized values, and for calculating a relationship strength between the first user and the second user based on the normalized values.

Therefore, the present invention provides a method, system and program product for calculating a relationship strength between users of a computerized network.

BRIEF DESCRIPTION OF THE DRAWING

These and other features of this invention will be more readily understood from the following detailed description of the various aspects of the invention taken in conjunction with the accompanying drawings in which:

FIG. 3 depicts method flow diagram according to the present invention.

Figure 1:
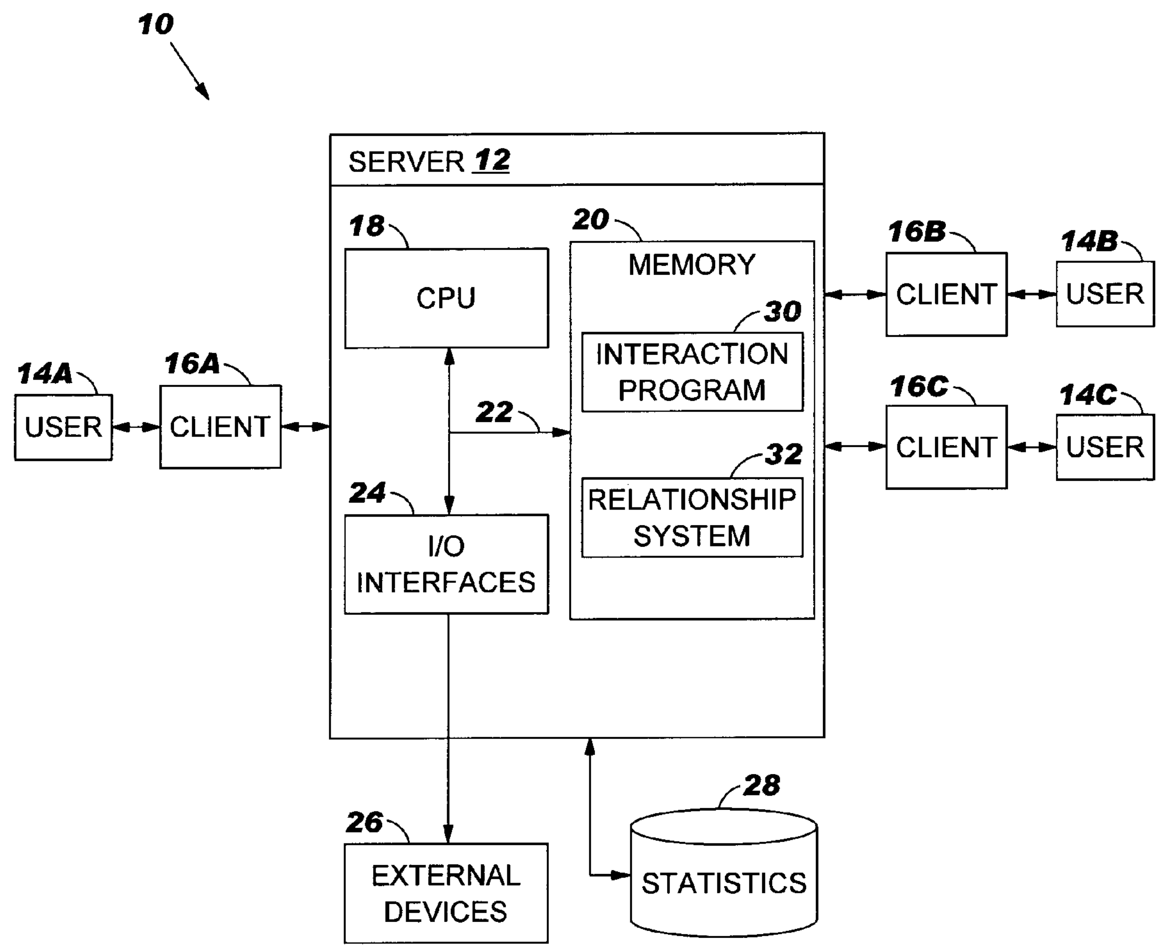
FIG. 1 depicts a system for calculating relationship strengths between users of a computerized network according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for calculating relationship strengths between users of a computerized network. Specifically, under the present invention a set of values is first determined. Such values include: a relative total value that is based on a total quantity of electronic interactions between a first user and a second user of the computerized network; a relative exclusive value that is based on a total quantity of electronic interactions exclusively between the first user and the second user; a relative longevity value that is based on a length of time the first user and the second user have been electronically interacting; and a relative recency value that is based on a recency of electronic interactions between the first user and the second user. Once determined, these values are weighted to yield normalized values. To calculate the relationship strength, the normalized values are summed and compared to a predetermined standard.

It should be understood in advance that as used herein the term "electronic interaction" typically refers to an electronic mail message or an instant message. However, "electronic interaction" should also be understood to refer to an electronic calendar entry, a contact list entry or any other way in which computer users can interact over a computerized network. It should also be understood that as used herein the term "between" (as used to describe electronic interactions between users) is intended to be bi-directional. For example, if there are 10 electronic interactions between users "A" and "B," the 10 electronic interactions could be from user "A" to user "B," from user "B" to user "A," or any combination thereof.

Referring now to FIG. 1, a system 10 for calculating relationship strengths between users 14A-C is shown. As depicted, users 14A-C operate clients 16A-C to communicate with each other over a computerized network. The computerized network can be any type of public network such as the Internet, or any type of private network such as a local area network (LAN), a wide area network (WAN), a virtual private network (VPN), etc. To this extent, communication between clients 16A-C and server 12 could occur via a direct hardwired connection (e.g., serial port), or via an addressable connection that may utilize any combination of wireline and/or wireless transmission methods. Server 12 and clients 16A-C may utilize conventional network connectivity, such as Token Ring, Ethernet, WiFi or other conventional communications standards. Moreover, connectivity could be provided by conventional TCP/IP sockets-based protocol. In this instance, clients 16A-C would utilize an Internet service provider to establish connectivity to server 12. Further, server 12 can be any type of server that fosters electronic interaction between users 14A-C. For example, server 12 can be a web server, an application server, an electronic mail server or the like.

In general, server 12 comprises central processing unit (CPU) 18, memory 20, bus 22, input/output (I/O) interfaces 24, external devices/resources 26 and storage unit 28. CPU 18 may comprise a single processing unit, or be distributed across one or more processing units in one or more locations, e.g., on a client and computer system. Memory 20 may comprise any known type of data storage and/or transmission media, including magnetic media, optical media, random access memory (RAM), read-only memory (ROM), a data cache, a data object, etc. Moreover, similar to CPU 18, memory 20 may reside at a single physical location, comprising one or more types of data storage, or be distributed across a plurality of physical systems in various forms.

I/O interfaces 24 may comprise any system for exchanging information to/from an external source. External devices/resources 26 may comprise any known type of external device, including speakers, a CRT, LCD screen, hand-held device, keyboard, mouse, voice recognition system, speech output system, printer, monitor/display, facsimile, pager, etc. Bus 22 provides a communication link between each of the components in server 12 and likewise may comprise any known type of transmission link, including electrical, optical, wireless, etc.

Storage unit 28 can be any system (e.g., a database) capable of providing storage for information under the present invention. Such information could include, among other things, statistics such as electronic interaction quantities and dates, etc. As such, storage unit 28 could include one or more storage devices, such as a magnetic disk drive or an optical disk drive. In another embodiment, storage unit 28 could include data distributed across, for example, a local area network (LAN), a wide area network (WAN) or a storage area network (SAN) (not shown). It should be understood that clients 16A-C will typically include computerized components (e.g., CPU, memory, etc.) similar to server 12. Such components have not been shown for brevity purposes.

Shown in memory 20 of server 12 are interaction program 30 and relationship system 32. Interaction program 30 is intended to represent any type of program that facilitates electronic interaction between users 14A-C. For example, interaction program 30 could be an electronic mail program (e.g., LOTUS NOTES, which is commercially available from International Business Machines Corp. of Armonk, N.Y.), an instant messaging program, etc. To this extent, although not shown, clients 16A-C will typically include one or more programs that are complimentary to interaction program 30 on server 12. As will be further described below, relationship system 32 includes program code for calculating relationship strengths between users 14A-C. In general, the relationship strengths are calculated by measuring certain statistics corresponding to electronic interactions between users 14A-C. For example, as an electronic mail message is communicated from user 14A to user 14B, the message will pass through, and be routed by interaction program 30. As the message is being routed, statistics pertaining to the electronic interaction are collected. Relevant statistics include identifying the users that the electronic interaction involved (e.g., sender and recipient(s)), the total quantity of electronic interactions between those users to date, the date of the electronic interaction, etc. This information is used to determine how strong the relationship is between users 14A and 14B.

Figure 2:
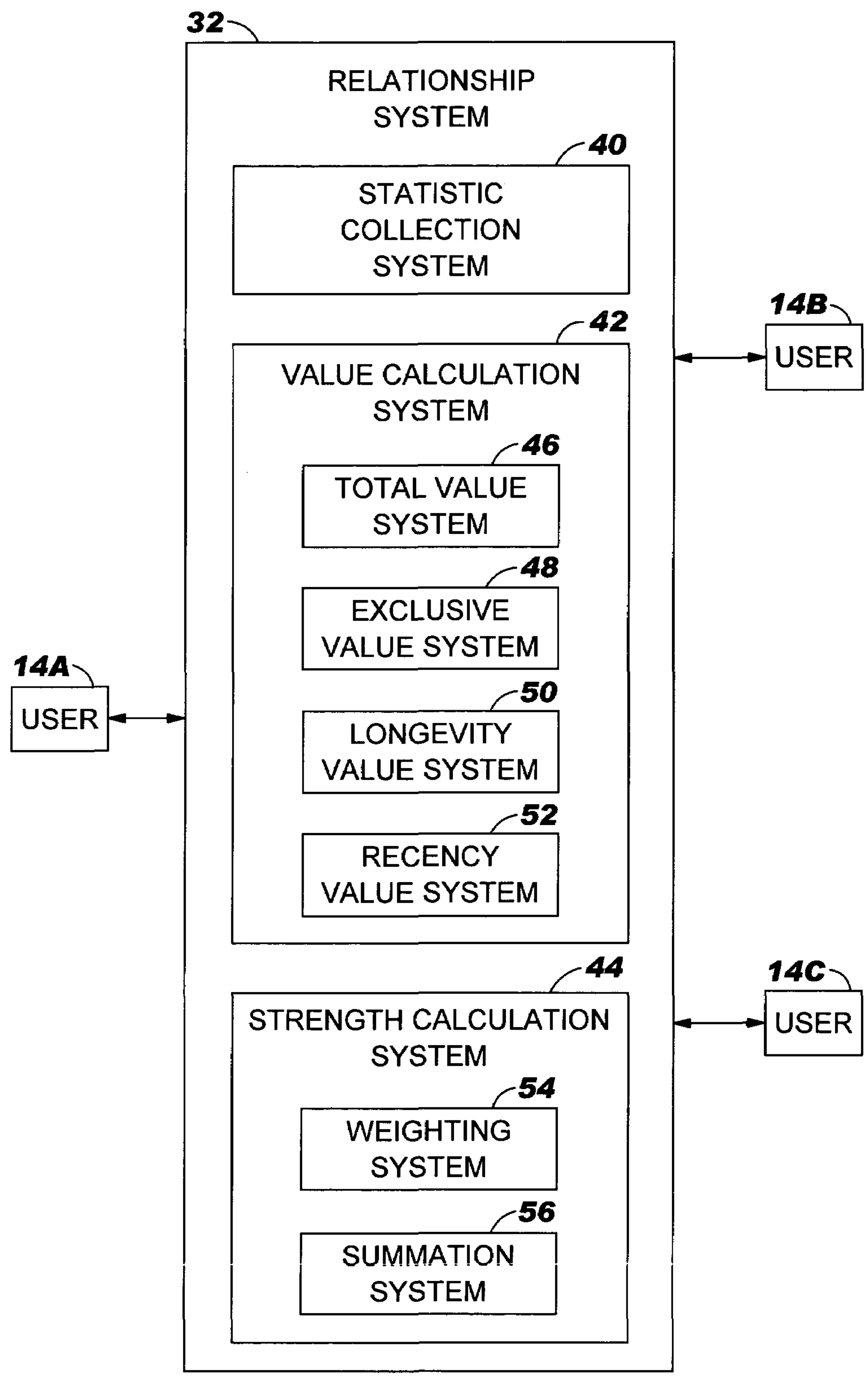
FIG. 2 depicts the relationship system of FIG. 1 in greater detail.

Referring now to FIG. 2, a more detailed diagram of relationship system 32 is shown. As depicted, relationship system 32 includes statistic collection system 40, value calculation system 42 and strength calculation system 44. As users 14A-C are interacting electronically, statistic collection system 40 will collect the statistics necessary to calculate the relationship strengths, and store the same in storage unit 28 (FIG. 1). As indicated above, relevant statistics include who the electronic interaction was between, a total quantity of electronic interactions between users 14A-C, as well as the date of each electronic interaction. For example, each time an electronic mail message is transmitted from user 14A to user 14B, statistic collection system 40 could update one or more entries in a table to reflect the interaction. Updating the entries could include incrementing a counter corresponding to the total quantity of electronic interactions between users 14A and 14B, and/or recording the date of the transmission. Regardless, once collected, the statistics are used by value calculation system 42 to determine a set of relative values that will be used to calculate the overall relationship strengths between users 14A-C. Such values include a relative total value, a relative exclusive value, a relative recency value and a relative longevity value. As will be further described below, the relative total value and the relative exclusive value generally pertain to a quantity of electronic interactions between two users. The relative recency value and the relative longevity value generally pertain to the currency and duration of the relationship between two users. Accordingly, the quantity or count of electronic interactions between two users is relevant in determining the relative total value and the relative exclusive value, while the date of electronic interactions is useful in determining the relative recency value and the relative longevity value.

As shown, value calculation system 42 includes total value system 46, exclusive value system 48, recency value system 50 and longevity value system 52. These systems are programmed to calculate the above-mentioned relative values. It should be understood that value calculation system 42 could be represented in a different quantity of subsystems. It is shown as such for illustrative purposes only. In any event, for a relationship between two specific users (e.g., 14A and 14B), total value system 42 will determine the relative total value. As indicated above, the relative total value for two specific users is based on a total quantity of electronic interactions between the two users. Specifically, the relative total value is a ratio of a total quantity of electronic interactions transmitted between the first user and the second user, to a total quantity of electronic interactions transmitted between the first user and all other users. For example, assume the following statistics were recorded by statistic collection system 40:

Total interactions between user 14A and user 14B: 10
Total interactions between user 14B and user 14C: 20
Total interactions between user 14A and user 14C: 30

In this case, since user 14A interacted with user 14B 10 times and all other users (i.e. user 14C) 30 times, the relative total value between users 14A and 14B would be $\frac{10}{30}$ or 33.33%. Once calculated, total value system 46 could store this value in storage unit 28 (FIG. 1).

Using a similar technique, exclusive value system 48 will calculate the relative exclusive value for users. In general, the relative exclusive value is based on a total quantity of electronic interactions exclusively between the first user and the second user. That is, the relative exclusive value represents electronic interactions with only one recipient such as from a first user to a second user (i.e., a one to one electronic interaction). To this extent, the relative exclusive value is a ratio of a total quantity of electronic interactions transmitted between the first user and the second user in which the second user is an exclusive recipient, to a total quantity of electronic interactions transmitted exclusively between the first user and all other users. For example, assume the following statistics:

Total one to one interactions between user 14A and user 14B: 2
Total one to one interactions between user 14B and user 14C: 5
Total one to one interactions between user 14A and user 14C: 25

In this case, since there were 2 one to one electronic interactions between users 14A and 14B, and 25 between users 14A and 14C, the relative exclusive value between users 14A and 14B is $\frac{2}{25}$ or 8%.

Longevity value system 50 will use date statistics to determine the relative longevity value, which generally measures the length or duration of a relationship. To this extent, the relative longevity value is based on the dates of electronic interactions between the users. Specifically, the relative longevity value for a given relationship between a first user and a second user is a ratio of the sum of absolute interaction dates in months (or some other unit of time) from the midpoint date between the first and last interaction for the relationship, to the maximum (greatest) sum of the absolute interaction dates in months for all of the first user's relationships. For example, assume the following electronic interactions:

Interactions between 14A and 14B:
- 1 interaction on Jan. 1, 2003
- 1 interaction on Feb. 1, 2003
- 1 interaction on Jun. 1, 2003

Interactions between 14B and 14C:
- 1 interaction on Jan. 1, 2003
- 1 interaction on Feb. 1, 2003
- 1 interaction on Mar. 1, 2003

Interactions between 14B and 14C:
- 1 interaction on Jan. 1, 2003
- 1 interaction on May 1, 2003
- 1 interaction on Jun. 1, 2003

In measuring an absolute interaction date, the difference in time in months between the midpoint date between the first and last electronic interaction, and the interaction date must be determined. For example, for electronic interactions between users 14A and 14B, the interaction dates are Jan. 1, 2003, Feb. 1, 2003 and Jun. 1, 2003. Accordingly, the midpoint between the first (Jan, 1, 2003) and last (Jun. 1, 2003) interaction dates is Mar. 15, 2003. To calculate absolute interaction dates for the electronic interactions between users 14A and 14B, the differences between this midpoint value and the respective interaction dates are determined and summed. Thus, the sum of absolute interaction dates in months for the relationship between users 14A and 14B based on the above statistics is calculated as follows:

(Mar. 15, 2003-Jun. 1, 2003)+(Mar. 15, 2003-Feb. 1, 2003)+(Mar. 15, 2003-Jan 1, 2003)=2.5 months+1.5 months+2.5 months=6.5 months Similarly, the sum of the absolute interaction dates in months for the relationship between users 14B and 14C (with the midpoint value being Feb. 1, 2002):

(Feb. 1, 2002-Jan. 1, 2002)+(Feb. 1, 2002-Feb. 1, 2002)+(Feb. 1, 2002-Mar. 1, 2002)=1 months+0 months+1 months=2 months The sum of the absolute interaction dates in months for the relationship between users 14A and 14C (with the midpoint value being Mar. 15, 2003):

(Mar. 15, 2003-Jun. 1, 2003)+(Mar. 15, 2003-May 1, 2003)+(Mar. 15, 2003-Jan. 1, 2003)=2.5 months+1.5 months+2.5 months=6.5 months These values each serve as the numerator for the relative longevity values (ratios).

They are also used to determine the maximum (greatest) sum for each user, which become the denominator in each ratio. It should be understood in advance, however, that under the present invention there are at least two ways of calculating the relative longevity ratio/value and the relative recency ratio/value (described in greater detail below). The first is uni-directional where the ratio from user 14A to user 14B is different from the ratio from user 14B to user 14A. The second way is bi-directional where the ratio from user 14A to user 14B is equal to the ratio from user 14B to user 14A. The former is advantageous if the values need to be normalized around user 14A. The later is advantageous if the values need to be normalized around the relationship. For example if the results will be presented to user 14A then the uni-directional approach should be used. If the values will be used by an administrator who is looking at the social network as a whole then the bi-directional way is likely better. This notion applies to both the relative longevity value, as well as the relative recency value which will be further described below. However, for the illustrative examples described herein, the bi-directional method be shown.

Accordingly, based on the above-calculated values, the maximum sum of the absolute interaction dates in months for user 14A is 6.5 months. Specifically, two of the above-calculated values involved user 14A. Namely, the relationship between users 14A and 14B, as well as the relationship between users 14A and 14C. Accordingly, the maximum sum of the interaction dates for users 14A-C using the bi-directional method is calculated as follows:

For user 14*A* MAX (6.5 months or 6.5 months)=6.5 months

For user 14*B* MAX (2.0 months or 6.5 months)=6.5 months

For user 14*C* MAX (6.5 months or 2.0 months)=6.5 months

Accordingly:

For users 14*A-B* MAX (6.5 months, 6.5 months)=6.5 months

For users 14*B-C* MAX (6.5 months, 6.5 months)=6.5 months

For users 14*A-C* MAX (6.5 months, 6.5 months)=6.5 months

These MAX values are then used as the denominator for the three relative recency values (ratios). Thus, the relative recency value between users 14A and 14B=6.5/6.5=1 or 100%.

Similarly, the relative recency volume between users 14B and 14C=2.0/6.5=0.31 or 31%.

Lastly, the relative recency value between users 14A and 14C=6.5/6.5=1 or 100%.

After longevity value system 50 has determined the relative longevity values, recency value system 52 will calculate a relative recency value for each relationship. Similar the relative longevity value, the relative recency value is based on dates of interaction and can be calculated on a uni-directional basis or a bi-directional basis. Under the present invention, a relative recency value for a relationship between a first user and a second user is a ratio of the sum of absolute interaction dates in months (or some other unit of time) for the relationship from some reference date, to the maximum sum of absolute interaction dates in months for all of the first user's relationships. For example, assume the following electronic interactions:

Interactions between users 14A and 14B:
- 1 interaction on Jan. 1, 2003
- 1 interaction on Feb. 1, 2003

Interactions between users 14B and 14C:
- 1 interaction on Jan. 1, 2002
- 1 interaction on Feb. 1, 2002

Interactions between users 14A and 14C:
- 1 interaction on Jan. 1, 2003
- 1 interaction on May 1, 2003

First, the sum of absolute interaction dates for each relationship must be calculated in months. Under the present invention, each absolute interaction date involves determining the difference between an interaction date and a reference date. For example, if Jun. 1, 2003is the present a date and is selected as a reference date, the absolute interaction date for an electronic interaction occurring on Jan. 1, 2003 would be (Jun. 1, 2003-Jan. 1, 2003) or 5 months.

Using this formula, the sum of the absolute interaction dates in months for the relationship between users 14A and 14B=

(Jun. 1, 2003-Jan. 1, 2003)+(Jun. 1, 2003-Feb. 1, 2003)=5 months+4 months=9 months Similarly, the sum of the absolute interaction dates in months for the relationship between users 14B and 14C=

(Jun. 1, 2003-Jan. 1, 2002)+(Jun. 1, 2003-Feb. 1, 2002)=17 months+16 months=33 months The sum of the absolute interaction dates in months for the relationship between users 14A and 14C=

(Jun. 1, 2003-Jan. 1, 2003)+(Jun. 1, 2003-May 1, 2003)=5 months+1 month=6 months These values represent the numerators of each respect relative recency value (ratio). The denominator is determined based on the maximum (greatest) sum of absolute interaction dates for users 14A-C. Specifically, in viewing these values, it can be determined that the maximum (greatest) sum of the absolute interaction dates in months for each pair of users 14A-C is 33 months. Specifically, the denominator for each pair of users 14A-C is calculated by the following:

For user 14*A* MAX (9 months, 6 months)=9 months

For user 14*B* MAX (9 months, 33 months)=33 months

For user 14*C* MAX (33 months, 6 months)=33 months

Accordingly:

For users 14*A*-14*B* MAX (9 months, 33 months)=33 months

For users 14*B-C* MAX (33 months, 33 months)=33 months

For users 14*A-C* MAX (9 months, 33 months)=33 months

Using these values, the relative recency value between users 14A and 14B=9 months/33 months=0.27 or 27%.

The relative recency value between users 14B and 14C=33 months/33 months=1.0 or 100%.

Lastly, the relative recency value between users 14A and 14C=6 months/33 months=0.18 or 18%.

Using the above examples, it can be seen that for the relationship between users 14A and 14B, we have the following values:

Relative total value=0.33

Relative exclusive value=0.08

Relative longevity value=1

Relative recency value=0.27

Once these values are determined, weighting system 54 will normalize the values. Specifically, weighting system 54 will apply a weighting factor to each relative value to yield weighted values. Thereafter, summation system 56 will sum the weighted values to yield a relationship strength. For example, assume we give each relative value 25% weight. Then the relationship strength would be calculated as follows:

$$(0.33\times0.25)+(0.08\times0.25)+(1\times0.25)+(0.27\times0.25)=0.0825+0.02+0.25+0.0675=0.42 \text{ or } 42\%.$$

This relationship strength can be compared to a predetermined standard to determine its relative strength. For example, a predetermined standard could be on the range of 0-100, with 100 being the strongest possible relationship and 0 being the weakest. In this case, the relationship between users 14A and 14B would likely be considered to have below-average strength.

Referring now to FIG. 3, a flow diagram 100 of a method according to the present invention is shown. As depicted, first step S1 is to determine a relative total value based on a total quantity of electronic interactions between a first user and a second user of the computerized network. Second step S2 is to determine a relative exclusive value based on a total quantity of electronic interactions exclusively between the first user and the second user. Third step S3 is to determine a relative longevity value based on a length of time the first user and the second user have been electronically interacting. Fourth step S4 is to determine a relative recency value based a recency of electronic interactions between the first user and the second user. Fifth step S5 is to weight the relative total value, the relative exclusive value, the relative recency value and the relative longevity value to yield normalized values. Sixth step S6 is to calculate a relationship strength between the first user and the second user based on the normalized values.

It is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. For example, the order in which the relative values are determined is not intended to be a limiting part of this invention. That is, any of the relative values could be determined in any order.

I claim:

1. A computer implemented method for calculating relationship strengths between users of a computerized network, comprising:

determining a relative total value based on a total quantity of electronic interactions between a first user and a second user of the computerized network;

determining a relative exclusive value based on a total quantity of electronic interactions exclusively between the first user and the second user;

determining a relative longevity value based on a length of time the first user and the second user have been electronically interacting, wherein the relative longevity value comprises a ratio of a sum of absolute interaction dates from a midpoint date between a first interaction and a last interaction between the first user and the second user, to a maximum sum of absolute interaction dates between the first user and all other users;

determining a relative recency value based on a recency of electronic interactions between the first user and the second user;

weighting the relative total value, the relative exclusive value, the relative recency value, and the relative longevity value to yield normalized values; and calculating a relationship strength between the first user and the second user based on the normalized values, wherein the relationship strength is used to facilitate communications between the first user and the second user.

2. The method of claim 1, wherein the electronic interactions are selected from the group consisting of electronic mail messages, instant message, calendar entries, and contact list entries.

3. A system for detecting relationship strengths between users of a computerized network, comprising:

a processor and a memory configured to:

determine:

a relative total value based on a total quantity of electronic interactions between a first user and a second user of the computerized network, a relative exclusive value based on a total quantity of electronic interactions exclusively between the first user and the second user, a relative longevity value based on a length of time the first user and the second user have been electronically interacting, wherein the relative longevity value comprises a ratio of a sum of absolute interaction dates from a midpoint date between a first interaction and a last interaction between the first user and the second user, to a maximum sum of absolute interaction dates between the first user and all other users, and a relative recency value based on a recency of electronic interactions between the first user and the second user; and weigh the relative total value, the relative exclusive value, the relative recency value, and the relative longevity value to yield normalized values, and for calculating a relationship strength between the first user and the second user based on the normalized values.

4. The method of claim 1, wherein the calculating step comprises summing the normalized values to yield the relationship strength between the first user and the second user.

5. The method of claim 1, wherein the electronic interactions are selected from the group consisting of electronic mail messages, instant message, calender entries and contact list entries.

6. A system for detecting relationships strengths between users of a computerized network, comprising:

a value calculation system for determining:

a relative total value based on a total quantity of electronic interactions between a first user and a second user of the computerized network, a relative exclusive value based on a total quantity of electronic interactions exclusively between the first user and the second user, wherein the relative exclusive value comprises a ratio of a total quantity of electronic interactions transmitted between the first user and the second user in which the second user is an exclusive recipient, to a total quantity of electronic interactions transmitted exclusively between the first user and all other users, a relative longevity value based on a length of time the first user and the second user have been electronically interacting, and a relative recency value based on a recency of electronic interactions between the first user and the second user; and a strength calculation system for weighting the relative total value, the relative exclusive value, the relative recency value and the relative longevity value to yield normalized values, and for calculating a relationship strength between the first user and the second user based on the normalized values.

7. The system of claim 6, further comprising collecting statistics corresponding to electronic interactions between the users of the electronic network, wherein the statistics are used by the determining to determine the relative total value, the relative exclusive value, the relative recency value, and the relative longevity value.

8. The system of claim 6, wherein the relative total value comprises a ratio of a total quantity of electronic interactions transmitted between the first user and the second user, to a total quantity of electronic interactions transmitted between the first user and all other users.

9. The system of claim 6, wherein the relative recency value comprises a ratio of a sum of absolute interaction dates between the first user and the second user from a reference date, to a maximum sum of absolute interaction dates between the first user and all other users.

10. The system of claim 6, wherein the determining further comprises:

weighting the relative total volume, the relative exclusive volume, the relative recency value, and the relative longevity value to yield the normalized values; and summing the normalized values to yield the relationship strength between the first user and the second user.

11. The system of claim 6, wherein the electronic interactions are selected from the group consisting of electronic mail messages, instant message, calendar entries, and contact list entries.

12. A program product stored on a computer readable medium for detecting relationship strengths between users of a computerized network, comprising:

program code for determining:

a relative total value based on a total quantity of electronic interactions between a first user and a second user of the computerized network, a relative exclusive value based on a total quantity of electronic interactions exclusively between the first user and the second user, a relative longevity value based on a length of time the first user and the second user have been electronically interacting, wherein the relative longevity value comprises a ratio of a sum of absolute interaction dates from a midpoint date between a first interaction and a last interaction between the first user and the second user, to a maximum sum of absolute interaction dates between the first user and all other users; and a relative recency value based on a recency of electronic interactions between the first user and the second user; and program code for weighting the relative total value, the relative exclusive value, the relative recency value, and the relative longevity value to yield normalized values, and for calculating a relationship strength between the first user and the second user based on the normalized values.

13. The program product of claim 12, further comprising program code for collecting statistics corresponding to electronic interactions between the users of the computerized network, wherein the statistics are used to determine the relative total value, the relative exclusive value, the relative recency value, and the relative longevity value.

14. The program product of claim 12, wherein the relative total value comprises a ratio of a total quantity of electronic interactions transmitted between the first user and the second user, to a total quantity of electronic interactions transmitted between the first user and all other users.

15. The program product of claim 12, wherein the relative exclusive value comprises a ratio of a total quantity of electronic interactions transmitted between the first user and the second user in which the second user is an exclusive reciepient, to total quantity of electronic interactions transmitted exclusively between the first user and all other users.

16. The program product of claim 12, wherein the normalized values are summed to yield the relationship strength between the first user and the second user.

17. The program product of claim 12, wherein the electronic interactions are selected from the group consisting of electronic mail messages, instant message, calendar entries, and contact list entries.

18. The method of claim 1, wherein the step of determining a relative total value comprises determining a ratio of a total quantity of electronic interactions transmitted between the first user and the second user, to a total quantity of electronic interactions transmitted between the first user and all other users.

19. The system of claim 6, wherein the relative exclusive value comprises a ratio of a total quantity of electronic interactions transmitted between the first user and the second user in which the second user is an exclusive recipient, to a total quantity of electronic interactions transmitted exclusively between the first user and all other users.

20. The program product of claim 12, wherein the relative recency value comprises a ratio of a sum of absolute interaction dates between the first user and the second user from a reference date, to a maximum sum of absolute interaction dates between the first user and all other users.

* * * * *